(12) United States Patent
Claassen et al.

(10) Patent No.: US 7,854,547 B2
(45) Date of Patent: Dec. 21, 2010

(54) BIDIRECTIONAL AND EXPANDABLE HEAT FLOW MEASUREMENT TOOL FOR UNITS OF AIR COOLED ELECTRICAL EQUIPMENT

(75) Inventors: Alan Claassen, Fremont, CA (US);
Dennis Hansen, Rochester, MN (US);
Cary Huettner, Rochester, MN (US);
Madhusudan Iyengar, Woodstock, NY (US); Roger Schmidt, Poughkeepsie, NY (US); Kenneth Schneebeli, San Jose, CA (US); Gerard Weber, Jr., Saugerties, NY (US)

(73) Assignee: International Business Machines Corporation, Armonk, NY (US)

( * ) Notice: Subject to any disclaimer, the term of this patent is extended or adjusted under 35 U.S.C. 154(b) by 653 days.

(21) Appl. No.: 11/834,752

(22) Filed: Aug. 7, 2007

(65) Prior Publication Data

US 2009/0041079 A1 Feb. 12, 2009

(51) Int. Cl.
*G01K 1/14* (2006.01)
*G01K 1/16* (2006.01)
*G01K 13/02* (2006.01)
*G01N 25/20* (2006.01)

(52) U.S. Cl. .................. 374/43; 374/29; 374/179; 374/143; 324/765; 361/690; 361/695; 361/717; 361/718; 361/719; 361/720; 361/722

(58) Field of Classification Search ................ 374/29, 374/30, 39, 40, 43, 44, 45, 100, 110–112, 374/115, 134–135, 137–138, 166, 152, 141–143, 374/147, 148, 208, 170, 179; 62/125, 127, 62/129, 130; 324/537, 555, 750, 754, 756–760, 324/763, 765; 361/709–712, 688, 690, 695, 361/694, 696, 704, 717, 718, 719, 720, 722; 252/962

See application file for complete search history.

(56) References Cited

U.S. PATENT DOCUMENTS

| | | | | |
|---|---|---|---|---|
| 4,608,819 | A * | 9/1986 | Colman et al. | 60/39.83 |
| 5,281,026 | A * | 1/1994 | Bartilson et al. | 374/143 |
| 5,410,448 | A * | 4/1995 | Barker et al. | 361/695 |
| 5,760,333 | A * | 6/1998 | Kitahara et al. | 174/16.3 |
| 5,907,473 | A * | 5/1999 | Przilas et al. | 361/699 |
| 5,947,189 | A * | 9/1999 | Takeuchi et al. | 165/51 |
| 7,214,131 | B2 * | 5/2007 | Malone | 454/184 |
| 7,233,493 | B2 * | 6/2007 | Wang et al. | 361/695 |
| 7,315,448 | B1 * | 1/2008 | Bash et al. | 361/701 |
| 7,347,058 | B2 * | 3/2008 | Malone et al. | 62/259.2 |
| 2002/0027942 | A1 * | 3/2002 | Nishijima et al. | 374/45 |
| 2005/0094706 | A1 * | 5/2005 | Guha et al. | 374/137 |

(Continued)

*Primary Examiner*—Gail Verbitsky
(74) *Attorney, Agent, or Firm*—Robert W. Lahtinen

(57) ABSTRACT

A tool is disclosed, for measuring the important thermal characteristics of a unit of electronic equipment, which obtains air flow and temperature readings at both air inlet and air outlet openings of the unit without disturbing cable or wiring connections or otherwise interrupting device operation. The tool pressure sensing element is rotatable between detented positions to permit the tool to be used at both air inlet and air outlet openings. The tool air duct portion may be formed of separate duct portions to enable a single duct portion including the sensing instrumentation to be used with multiple duct portions that conform to electronic device air inlet and outlet openings to impart added flexibility to the tool.

9 Claims, 2 Drawing Sheets

U.S. PATENT DOCUMENTS

| | | | |
|---|---|---|---|
| 2007/0097636 A1* | 5/2007 | Johnson et al. | 361/695 |
| 2008/0040067 A1* | 2/2008 | Bashor et al. | 702/132 |
| 2008/0055850 A1* | 3/2008 | Carlson et al. | 361/695 |
| 2009/0030554 A1* | 1/2009 | Bean et al. | 700/276 |
| 2010/0027581 A1* | 2/2010 | Sasaoka | 374/137 |
| 2010/0046574 A1* | 2/2010 | Hamann et al. | 374/43 |
| 2010/0051243 A1* | 3/2010 | Ali et al. | 165/104.33 |
| 2010/0065355 A1* | 3/2010 | Reddy | 180/65.31 |

\* cited by examiner

BIDIRECTIONAL AND EXPANDABLE HEAT FLOW MEASUREMENT TOOL FOR UNITS OF AIR COOLED ELECTRICAL EQUIPMENT

FIELD OF THE INVENTION

The invention is directed to a device for obtaining the values of thermal characteristics of electrical equipment and more particularly to a tool for determining values of the thermal characteristics of air cooled electrical devices without interruption of device operation.

BACKGROUND OF THE INVENTION

Data centers are increasingly under stress to provide proper ventilation to the equipment that it uses. The equipment design provides for adequate air circulation and heat dissipation. However, over time the conditions of the ambient atmosphere, in which the equipment operates may cause the heat dissipation capability to be degraded by reduced air flow or reduced heat transfer capability. In order to properly assess the thermal characteristics of data center equipment and its environment it is important to have measurements of the key thermal properties that govern these characteristics, air inlet side values of ventilation air temperatures and ventilation air flow rates and air outlet side values of air flow rate, air temperatures and heat dissipation. Inlet side characteristics are generally not too difficult to obtain, but tedious nonetheless less. However the outlet side is much more difficult as there is generally no common monitoring software on units of electronic equipment that provide this important information. So the question is how to quickly and easily capture these key characteristics of an electronic device such that the thermal/power profile of a data center can be displayed.

The ability to obtain the necessary air flow and temperature data is further complicated by the necessity to do so without interrupting the operation of the specific equipment or the system of which it is a part. The operator of the data center will be reluctant to allow any testing that could interrupt or even disturb operation of any component part of the system. Thus, any test equipment used must not impair continuing system operation. The measurement of air flow and temperature must be accomplished with any connected cables and wiring in place.

SUMMARY OF THE INVENTION

The present invention is directed to a tool designed to measure the important thermal characteristics of electronic equipment. The tool is particularly adapted for use with rack mounted equipment wherein, each rack mounted device must tolerate another device mounted closely adjacent; above, below and at either side. The air flow is typically induced through the front surface and exits through the rear surface, with the front and rear surfaces having the same width and height dimensions. An example of such a device is a server which, in a normal operating environment, is expected to remain in continuous service. The operator of such a server is unlikely to permit operation to be interrupted for testing and is likely to be reluctant to have testing occur during continuing operation. The tool will measure device air inlet temperature, device air outlet temperature, device air flow and finally device power consumption.

Rack mount cabinets are available in a few standard widths and have the equipment mounting height identified in "u" units of incremental height, whereby a horizontally mounted full width unit is designated in multiples of u height units. The present invention is shown and described as a 2u device, but could be readily adapted to any other standard height. Such devices utilize the entire rack width and may have similar units immediately above and below.

The tool must substantially conform to either the front or rear surface of the rack mounted unit of electronic equipment and do so without disturbing connected cables or wiring. To do so, the tool must contact the unit with a compliant marginal wall portion to assure a substantially continuous confined surface duct between the unit surface and the tubular section of the tool that captures temperature and pressure values. Though various means may be used, the tool as shown and described includes a band of bristles along the tool edge that contacts the device to conform to the surface while enabling cables and wires to remain connected and operational.

The tool may also be formed as two separate parts wherein the sensing and metering apparatus are included with a first duct portion and the second duct portion, which terminates in a configuration that conforms about the air inlet or air outlet surfaces of a unit of air cooled equipment to be tested, is formed as a second part. The first duct portion, containing the sensing and metering instrumentation, can then be used with many pieces of equipment having varying air inlet and air outlet configurations.

DETAILED DESCRIPTION

Figure 1:
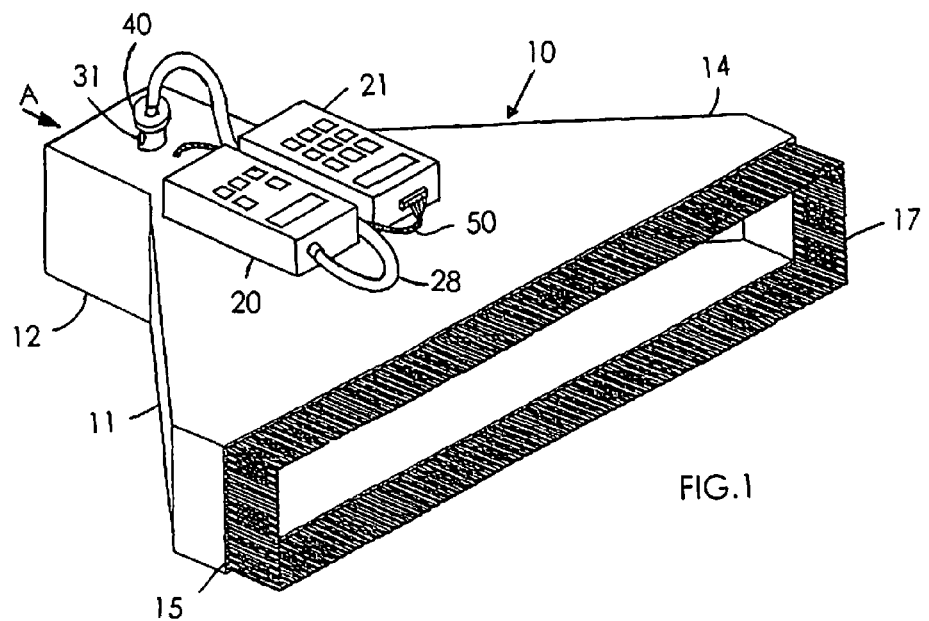
FIG. 1 is an isometric view of the tool of the present invention.

Referring to the drawings, the tool 10 of the present invention is shown in FIG. 1. The shell 11 of the tool is formed as a duct with a first portion 12 of substantially constant cross sectional configuration which contains the physical condition sensing devices. From the duct first portion 12, a second portion 14 expands and terminates in a configuration to surround the air inlet or air outlet of a unit of electronic equipment to be evaluated. The duct edge 15 is provided with a band of material that will conform to the surface of the device to be tested, while accommodating any cables or wiring connected to the device. As shown, a band of fibers or bristles 17 extend from the edge 15 of the rigid duct which can deflect to conform to the device surface while any operating cables or wiring remain connected and operational. A pair of meters 20 and 21, mounted on the shell 11, measure the air pressure and temperature respectively in response to conditions sensed within the first duct portion 12.

Figure 3:
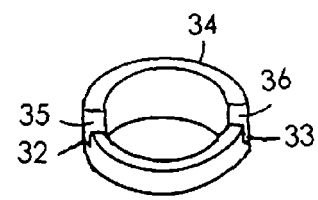
FIG. 3 is a view of the collar attached to the duct which permits the tubular pitot element of FIG. 2 to rotate through 180 degrees to position the pitot openings in either axial direction.
Figure 2:
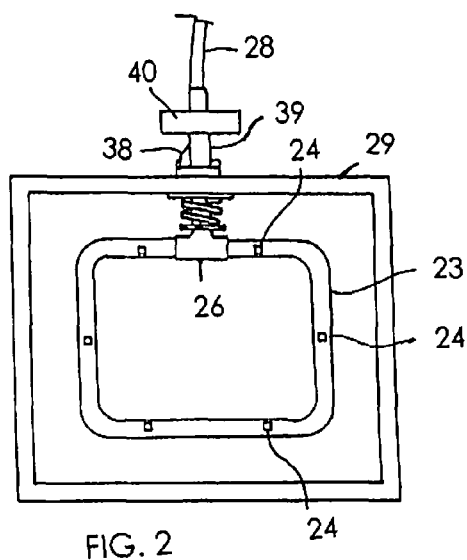
FIG. 2 is an axial elevation taken from the end of the small duct portion of the tool of FIG. 1

FIG. 2 is an elevation of the tool 10 taken in the direction of arrow A at the termination of the duct first portion 12. A tubular element 23, formed as a closed loop of rigid tubing, presents a series of pitot openings 24 that form a pitot array which senses the pressure generated by air flow through the duct portion 12. The tee 26, connected to the tubing loop 23, connects to the flexible tubing 28 which in turn is connected to the meter 20. The tubular element 23 is pivotably supported on and through the duct wall 29. A collar 31 (also shown in the enlarged view of FIG. 3) is attached to the duct wall 29. Collar 31 includes detent slots 32 and 33 and an axially longer wall portion 34 presents wall surfaces 35 and 36 that limit rotation of tubular element 23. A latch 38 is rigidly mounted on tubular element tube portion 39 as is knob 40. When latch 38 is disposed in detent 32 (as in FIG. 2), the pitot openings 24 confront the duct opening to measure air pressure when the tool is used at the air inlet of a device under test. The latch 38 is held in the selected one of detents 32 and 33 by a spring 42 which biases the tubular element 23 downward as seen in FIG. 2. Spring 42 is disposed between a shoulder 43 formed on tube portion 39 and an annulus 44 on the duct wall 29. By lifting knob 40, the tubular element is raised against the biasing force of spring 42 to permit latch 38 to be moved on or above collar arcuate surface 46 to the other of detents 32 and 33. Moving latch 38 from detent 32 to detent 33 causes the tubular member pitot openings 24 to face in the opposite axial direction to enable the tool to be used at the air outlet surface of the device to be tested.

Figure 4:
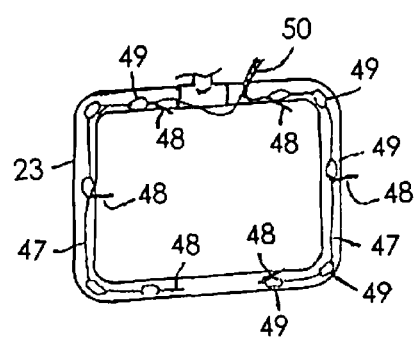
FIG. 4 shows the reverse side of the tubular pitot element of FIG. 2 and the pattern of thermocouple elements attached thereto.

FIG. 4 illustrates the side of the tubular element 23 opposite that shown in FIG. 2. A series of thermocouple hot junctions 48 are mounted on the tubular element 23. The thermocouple wires 47 are periodically secured to the tubing element 23 by spots 49 of resin adhesive 49 and are progressively gathered together to become wrapped as a cable 50 which extends through the duct upper wall 29 and terminates at a connector 51 on the thermocouple meter 21 (FIG. 1).

Figure 5:
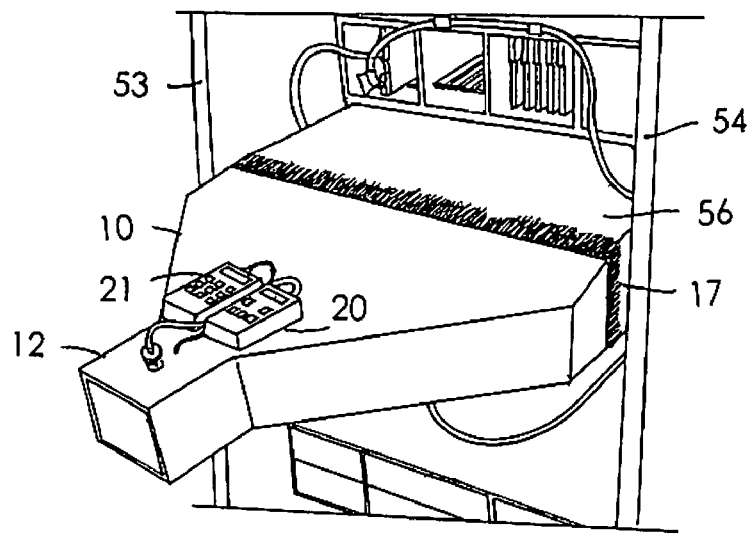
FIG. 5 is a horizontal segment, rear view of a partially populated rack mount cabinet including a server with the tool of the present invention positioned to measure the exiting air flow and temperature.

FIG. 5 shows a partial horizontal segment of a rack mount cabinet with inwardly turned flanges 53 and 54 which define the rear wall location. The rack mounted equipment includes a server 56 that occupies the full width of the cabinet and has a 2u height. The tool 10 is shown positioned at the server rear wall with the bristle band 17 surrounding the server rear wall air outlet openings.

The tool 10 measures temperatures and air flow rates and then through a simple algorithm computes the device heat load. Tool 10, formed as a duct that funnels the air flow, can be used in both suction and exhaust mode, that is, it can be placed on the inlet of a device or on the outlet as seen in FIG. 5. When placed over the inlet side of the device the air flow enters the duct first portion 12 and then expands to flow into the device inlet with the duct designed to have a very low impedance to air flow such that air flow through the device is not significantly affected. The tubular element 23 (FIG. 2) is positioned such that the series of pitot openings are directed toward the incoming air flow. Tool 10 is calibrated so a flow versus pressure drop curve is developed enabling air flow to be determined. By measuring the air pressure using the meter 20 mounted on the tool, air flow through the device can be determined based on the calibration curve. Also, the series of thermocouples 48 (FIG. 4) are arranged in a manner to obtain an average air inlet temperature to the device using the thermocouple meter 21.

The tool 10 is thereafter positioned over the outlet of the device. Since devices commonly have cables exiting the rear, the tool 10 is designed with brush like fibers 17 attached to the perimeter of the enlarged portion of the duct. This band of fibers or bristles can be up to 7 inches long and are very flexible enabling the fibers to intersperse with the cables to capture most of the air flow from the device by sealing about the cables and to the rear of the device. The air flow rate which was measured on the inlet side of the device can also be measured at the outlet side of the device by rotating the tubular element 180 degrees causing air flow to impact the pitot array holes 24. The tool is also calibrated in this mode enabling exhaust air flow rate to be determined. In addition, air out temperature is measured by the thermocouple array 48. With air flow and temperatures measured at both inlet and outlet of the device, the heat dissipated by the device can be computed by the equation:

$$Q(\text{watts}) = 0.56(\text{delta } T)(\text{flow rate})$$

wherein T is degrees centigrade and the flow rate is cubic feet per minute.

Figure 6:
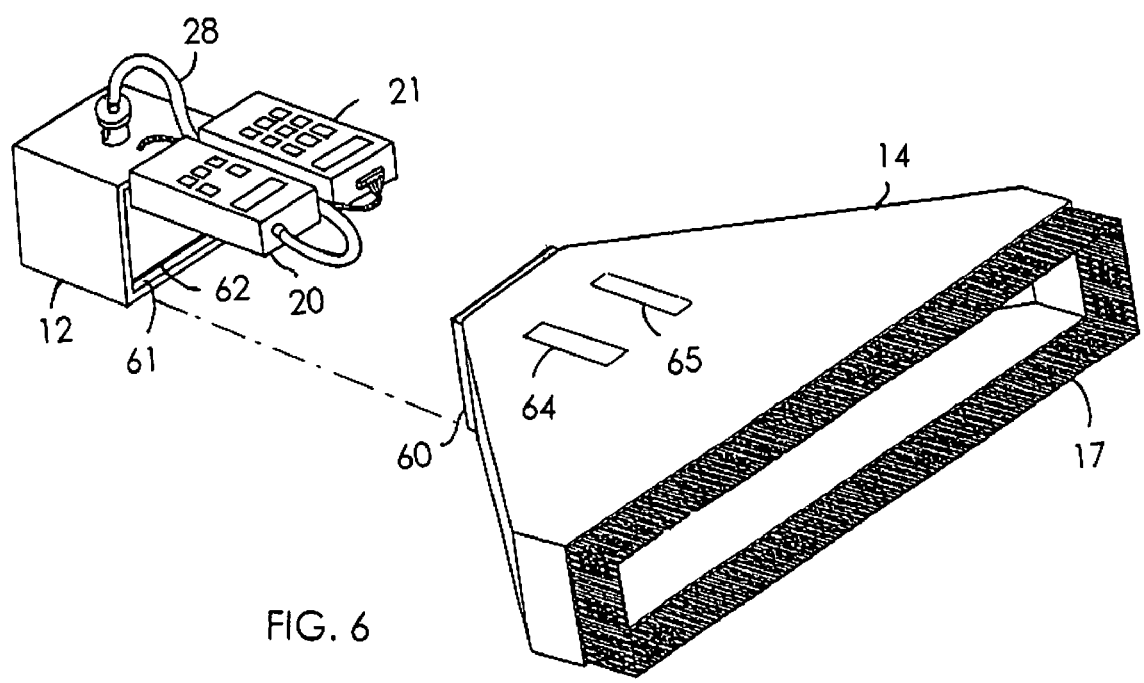
FIG. 6 shows a second embodiment of the invention wherein the duct small cross section first portion is a separate part enabling multiple second duct portions to be used, making the tool adaptable to many device air inlet and air exhaust surface configurations.

FIG. 6 illustrates a second embodiment of the invention. The first duct portion 12 and the second duct portion 14 are formed as separate parts which are joined together when the flange portion 60 is received in the first duct portion opening defined by the reduced thickness surface 61, with the first duct portion wall surface 62 abutting the second duct portion wall surface adjoining the flange surface 60. As shown, the meters 20 and 21 are releasably secured to the second duct portion 14 by hook and loop tape as indicated at 64 and 65 respectively. Alternatively, the meters 20 and 21 could be supported on the first duct portion 12. By forming the first and second duct portions as separate parts, the tool is made more flexible in that the first duct portion including the operating elements, can be used with second duct portions having many terminal end configurations.

The foregoing description of embodiments of the invention has been presented for purposes of illustration and description. It is not intended to be exhaustive or limit the invention to the precise form disclosed. Many modifications and variations, both as suggested and others, are possible in light of the above teaching. It is intended that the scope of the invention not be limited by the description and illustrations, but rather by the claims appended hereto.

What is claimed is:

1. A device for measuring a plurality of thermal characteristics of a unit of air cooled electronic equipment comprising:
   a first duct portion of generally constant cross sectional area;
   first sensing means within said first duct portion for sensing air pressure indicative of air flow through said first duct portion;
   second sensing means within said first duct portion for sensing the temperature of air flowing through said first duct portion;
   a second duct portion extending from one end of said first duct portion and terminating at the opposite end with a cross sectional configuration corresponding to one of the input and output air flow surfaces of a unit of electronic equipment to be tested; and
   contacting means mounted at the margin of said opposite end of said second duct portion for flexibly conforming about said one of said input and output air flow surfaces of said unit of electronic equipment to be tested.

2. The device of claim 1 wherein said first sensing means includes a plurality of pitot pressure sensing openings confronting the air flow within said first duct portion.

3. The device of claim 2 wherein said second sensing means comprises a plurality of thermocouples with hot junctions positioned within said first duct portion.

4. The device of claim 3 wherein said plurality of pitot openings are formed in a tubular element that presents said openings in a pattern confronting air flow within said first duct portion.

5. The device of claim 4 wherein said plurality of thermocouple hot junctions are mounted on said tubular element at the side thereof opposite the side at which said pitot openings are presented.

6. The device of claim 4 wherein said tubular element is rotatable to enable said pitot openings to face in either axial direction within said first duct portion.

7. The device of claim 6 which includes tubular element mounting means, connected to said tubular element, which has a pair of detents wherein one of said detents retains said tubular element with said pitot openings facing in one axial direction and the other of said detents retains said tubular element with said pitot openings facing in the other of said axial directions and wherein said mounting means confines rotation of said tubular element to a single 180 degree arc.

8. The device of claim 3 wherein said contacting means comprises a band of bristles extending from said margin of said opposite end of said second duct portion.

9. The device of claim 3 wherein said first duct portion and said second duct portion are formed as separate, connectable parts, whereby said first duct portion may be used with a plurality of second duct portions having opposite terminal ends with differing configurations.

* * * * *